D. LAKE.
ANIMAL TRAP.

No. 246,155. Patented Aug. 23, 1881.

Witnesses:
John A. Hughes
F. E. Zerbe

Inventor:
Darius Lake,
By J. S. Zerbe
Atty.

UNITED STATES PATENT OFFICE.

DARIUS LAKE, OF BRECKINRIDGE, MISSOURI.

ANIMAL-TRAP.

SPECIFICATION forming part of Letters Patent No. 246,155, dated August 23, 1881.

Application filed November 8, 1879.

*To all whom it may concern:*

Be it known that I, DARIUS LAKE, of Breckinridge, in the county of Caldwell and State of Missouri, have invented a new and useful Improvement in Animal-Traps, which improvement is fully set forth in the following specification and accompanying drawings, in which—

Figure 1:
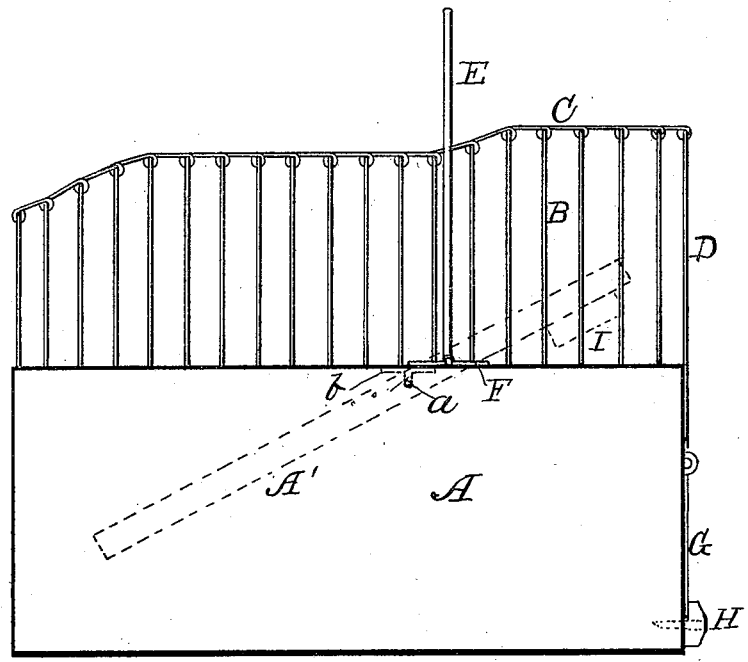
Figure 2:
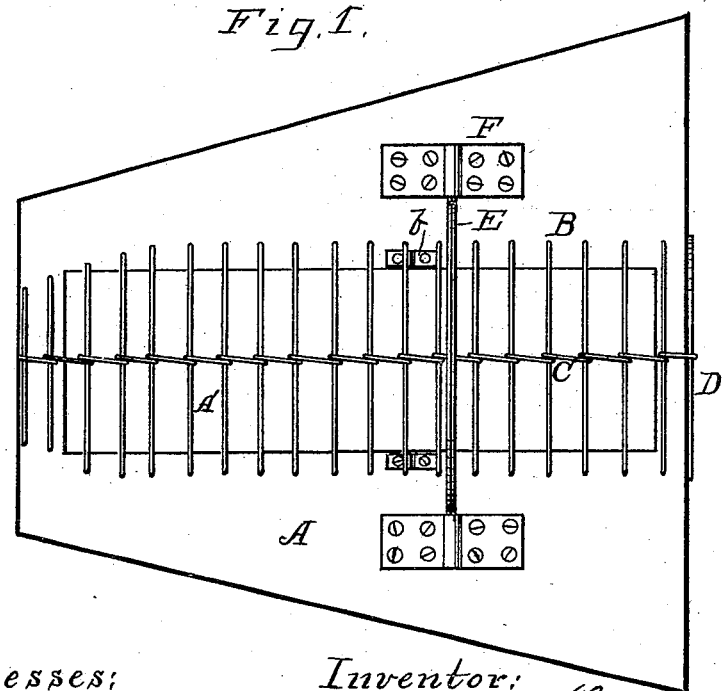

Figure 1 is a side elevation, and Fig. 2 a top view, of the same.

The object of my invention is a mouse-trap so constructed that when the animal treads upon the tilting device it cannot release itself or spring out from either side of the pivoted floor.

In the drawings, A represents the box or chamber for the reception of the animal when caught. This chamber can be made in any suitable form or shape. In the top is a tilting floor, A', pivoted a little to one side of its middle portion by means of pins $a$ hung in loop $b$. A weight, I, under the short end of the tilting floor A' serves to balance the same and keep the tilting floor on a level with the upper surface of the chamber A. Wire guard B spans in an arch this tilting floor A', and a wire, C, wrapped around the top of each arched wire B, successively serves to hold the wires of the guard B firmly in position and prevent the animal from forcing its way into or out of the trap between the wires B. At the smaller end of the box or chamber A the wires of the guards are drawn together somewhat, making the arch smaller, so as to leave an entrance for the animal only a little larger than the animal itself. The contracted mouth or entrance to said cage will materially aid in preventing the animal escaping when it has once gotten within the cage. The long narrow shape of the arch B will also tend to prevent the animal from turning about when once inside the same, thus insuring its capture. At this end of the trap the tilting floor A' descends, and when the animal enters and treads upon the floor it falls and the guards B prevent it from springing out. The opposite end, D, of the wire cage is closed. A bail, E, is attached centrally to clips F for removing the trap from place to place. At one end of the chamber A is a door, G, which is held firmly closed by means of a button, H.

Having described my invention, what I claim as new, and desire to secure by Letters Patent, is—

In a trap, A, the tilting and counterbalanced floor A' in the top, in combination with the long and narrow wire cage B, contracted at its opening or mouth and strengthened by enwrapping-wire C, all substantially as described.

In testimony that I claim the foregoing I have hereunto subscribed my hand this 31st day of October, A. D. 1879, in the presence of witnesses.

DARIUS LAKE.

Witnesses:
J. W. PLUMB,
C. W. HIGGINS.